(12) United States Patent
Hunt (10) Patent No.: US 10,098,290 B2
(45) Date of Patent: Oct. 16, 2018

(54) DOUBLE CUT CONTROL FOR DISC SAW FELLING HEAD

(71) Applicant: Deere & Company, Moline, IL (US)

(72) Inventor: Jonathan R. Hunt, Garnavillo, IA (US)

(73) Assignee: DEERE & COMPANY, Moline, IL (US)

( * ) Notice: Subject to any disclaimer, the term of this patent is extended or adjusted under 35 U.S.C. 154(b) by 517 days.

(21) Appl. No.: 14/858,514

(22) Filed: Sep. 18, 2015

(65) Prior Publication Data

US 2017/0079220 A1    Mar. 23, 2017

(51) Int. Cl.
*A01G 23/091*    (2006.01)
(52) U.S. Cl.
CPC ................... *A01G 23/091* (2013.01)
(58) Field of Classification Search
CPC .................................................. A01G 23/091
See application file for complete search history.

(56) References Cited

U.S. PATENT DOCUMENTS

2015/0030424 A1*  1/2015  Stulen ............... E02F 3/436
                                                                 414/680

\* cited by examiner

*Primary Examiner* — Yuen H Wong
(74) *Attorney, Agent, or Firm* — Klintworth & Rozenblat IP LLP; Steven Wietrzny (57) ABSTRACT

A double cut control system and method are disclosed for a felling head having a saw disc. The felling head may be positioned by a knuckle boom, which includes a hoist boom and a stick boom coupled by a knuckle and positioned by hydraulic cylinders actuated by a hydraulic pump and hydraulic control valves. The control system has an operator input device for input of operator commands including a double cut control input command. Position sensors provide position values for the knuckle boom and the felling head. At least one controller receives the operator commands and position values. After receiving the double cut control input command, the controller generates a first cut control signal to direct flow of hydraulic fluid to the hydraulic cylinders to position the knuckle boom to advance the felling head in a single fore-aft direction a set distance corresponding to a partial depth cut.

20 Claims, 6 Drawing Sheets

FIG. 6E

DOUBLE CUT CONTROL FOR DISC SAW FELLING HEAD

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to tree felling heads and the operational control of such heads.

BACKGROUND OF THE DISCLOSURE

In the forestry industry various work machines, such as wheeled and tracked feller bunchers, may be utilized in the tree-harvesting process. A felling head may be mounted to the feller buncher by a knuckle boom to position the felling head in proximity to a standing tree. The felling head may have one or more large saw discs with peripheral teeth that are rotated by a hydraulic motor so as to cut into the tree. The hydraulic motor may be coupled to, and powered by, the hydraulic system of the feller buncher. The felling head may have a large grapple or other members to clamp around a cut tree and carry it to a transport machine, such as a forwarder, or to a stacking location.

Even with large diameter saw discs of modern felling heads, large trees may have a larger trunk diameter such that operator may need to make successive cuts to fell the tree. The large size of the saw disc generates very large angular velocities when rotated at cutting speeds. To reduce power demands on the hydraulic system, kinetic inertia may be relied upon for a cutting operation as way to supplement or supplant the hydraulic power required for the motor to rotate the saw disc. Further, the effect of inertia may need to be compensated for in order to control the depth of a cut. The effect of inertia and the complexities of positioning the felling head may both need to be managed when making multiple cuts into the tree.

SUMMARY OF THE DISCLOSURE

The disclosure provides a system and method for making a double cut with a disc saw felling head.

In one aspect the disclosure provides a double cut control system for a felling head having a saw disc and positioned by a knuckle boom having a hoist boom and a stick boom coupled by a knuckle. The knuckle boom may be positioned by hydraulic cylinders actuated by a hydraulic pump and hydraulic control valves. The control system has an operator input device for input of operator commands including a double cut control input command. Position sensors provide position values for the knuckle boom and the felling head. At least one controller receives the operator commands and position values. After receiving the double cut control input command, the at least one controller generates a first cut control signal to direct flow of hydraulic fluid to the hydraulic cylinders to position the knuckle boom to advance the felling head in a single fore-aft direction a set distance corresponding to a partial depth cut.

In another aspect the control system has an operator input device for input of operator commands including a double cut control input command. Position sensors provide position values for the knuckle boom and the felling head. A load sensor provides load values of a motor driving the saw disc. At least one controller receives the operator commands, the position values and the load values. After receiving the double cut control input command and a load value corresponding to at least one of a prescribed motor speed reduction and a prescribed motor pressure rise, the at least one controller generates a first cut control signal to direct flow of hydraulic fluid to the hydraulic cylinders to position the knuckle boom to advance the felling head in a single fore-aft direction a set distance corresponding to a partial depth cut.

In yet another aspect the disclosure provides a double cut control method for a felling head having a saw disc. The method includes receiving, by one or more controllers, a double cut control input command from an operator input device, receiving, by the one or more controllers, position values for the knuckle boom and the felling head from one or more position sensors; and generating, by the one or more controllers, a first cut control signal to direct flow of hydraulic fluid to the hydraulic cylinders to position the knuckle boom to advance the felling head in a single fore-aft direction a set distance corresponding to a partial depth cut.

The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

The following describes one or more example embodiments of the disclosed double cut system and method, as shown in the accompanying figures of the drawings described briefly above. Various modifications to the example embodiments may be contemplated by one of skill in the art.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

As used herein, the term "module" refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the feller buncher described herein is merely one exemplary embodiment of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

The following describes one or more example implementations of the disclosed system for control of end effector movement to perform a double cut operation, as shown in the accompanying figures of the drawings described briefly above. Generally, the disclosed control systems (and work vehicles on which they are implemented) allow for improved operator control of the movement of an end effector during a double cut operation, as compared to conventional systems.

Generally, an end effector may be supported with respect to a work vehicle (or other work machine) by a knuckle boom assembly and the knuckle boom assembly may be moved by various actuators in order to accomplish tasks with the end effector. Discussion herein may sometimes focus on the example application of moving an end effector configured as a felling head for a feller buncher, with actuators for moving the felling head generally configured as hydraulic cylinders. In other applications, other configurations are also possible. In some embodiments, for example, sprayers, claws, grapples, or other devices may also be configured as movable end effectors. Likewise, work vehicles in some embodiments may be configured as excavators or other diggers, as forwarders, as skidders, as concrete crushers or similar machines, as sprayers, or in various other ways.

The disclosed control system may be used to receive operator commands for movement of an end effector to perform a double cut operation. The control system may determine to initiate a first, partial depth cut based on the receipt of the operator command for the double cut operation. In various embodiments, the control system determines to enable the first, partial depth cut based on the receipt of an operator input command, load values associated with a hydraulic motor of the end effector and/or a proximity of the end effector to an object. Once a first, partial depth cut is enabled, in the example of a feller buncher, the control system may determine a first set distance for the end effector to move to complete the first, partial depth cut. In this example, the control system may also determine a second set distance for the end effector to move to complete a second cut. In certain embodiments, the first set distance may be determined by the control system based on a sensed input, such as a dimension observed by a sensor. In other embodiments, the first set distance may be determined based on a default or factory set value. Further, the first set distance may also be determined from an operator input command that provides the dimension of the object.

The control system may determine a position of the knuckle boom assembly and the end effector based on sensed input received from one or more position sensors associated with the knuckle boom assembly and/or end effector. Based on the determined position of the knuckle boom assembly, the determined position of the end effector and the first set distance, the control system may determine a movement value for the actuators of the knuckle boom assembly and the end effector such that the commanded movement of the actuators provides the commanded movement of the end effector to complete the first, partial depth cut. In this way, a double cut operation may be performed with precision such that the first, partial depth cut is not too deep and does not cause the tree to topple, and moreover, the first, partial depth cut is not too shallow, thereby preventing the second cut from severing the tree.

Once the first, partial depth cut is completed, the control system may receive an operator input command for the second cut to sever the tree. Based on the receipt of the operator input command for the second cut, the control system may determine the position of the knuckle boom assembly and the end effector based on the sensed input. Based on the determined position of the knuckle boom assembly, the determined position of the end effector and the second set distance, the control system may determine a movement value for the actuators of the knuckle boom assembly and the end effector such that the commanded movement of the actuators provides the commanded movement of the end effector to complete the second cut and sever the tree.

Figure 1:
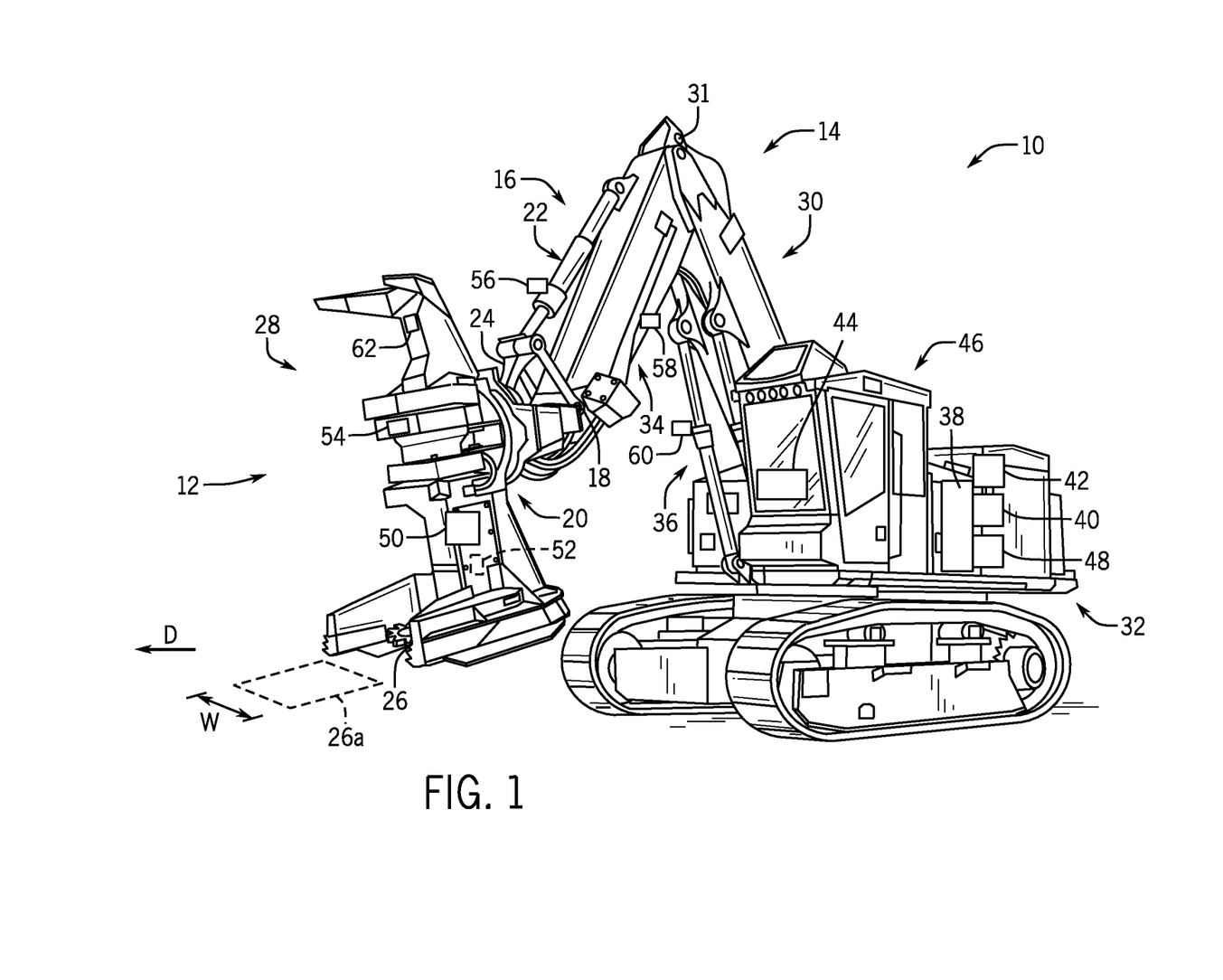
FIG. 1 is a perspective view of an example work machine in the form of a tracked feller buncher in which the disclosed double cut control system and method may be used.

As noted above, the disclosed double cut control system may be utilized with regard to various machines with end effectors, including feller bunchers, forestry swing machines, harvesters and other machines for cutting and sawing operations. Referring to FIG. 1, in some embodiments, the disclosed double cut control system may be used with a feller buncher 10 to control movement of an end effector configured as a felling head 12 mounted to the end of a knuckle boom or knuckle boom assembly 14. It will be understood that the configuration of the feller buncher 10 is presented as an example only.

In the embodiment depicted, the felling head 12 is pivotally mounted to a stick boom 16 of the knuckle boom assembly 14 at a stick pin 18 of a wrist assembly 20. A hydraulic cylinder 22 is mounted to the stick boom 16 and to a linkage 24 attached to the wrist assembly 20, such that the hydraulic cylinder 22 may be actuated in order to pivot the felling head 12 about the stick pin 18. Due to the depicted assembly of the wrist assembly 20, a movement of the stick pin 18 may generally be viewed as an equivalent to a corresponding movement of the felling head 12 as a whole. In some embodiments, other actuators (not shown) may be utilized to provide other movement of the felling head 12 (e.g., rotation about an axis that is perpendicular to the stick pin 18).

Generally, a felling head 12 may include a cutting mechanism for cutting standing trees or other objects, as well as various other features. As depicted, for example, the felling head 12 includes a saw disc 26 defining a cutting plane 26a, as well as clasping arms 28 for securing cut and un-cut trees to the felling head 12. Other end effectors may include other mechanisms, including mechanisms for tasks other than cutting and clasping. Similarly, other end effectors may include features that define a different reference plane.

The knuckle boom assembly 14 also includes a hoist boom 30 that is pivotally attached to the stick boom 16 via a knuckle 31 opposite the attachment of the stick pin 18 to the stick boom 16. The hoist boom 30 is also pivotally attached to a frame 32 of the feller buncher 10 opposite the attachment of the hoist boom 30 to the stick boom 16. A hydraulic cylinder 34 is mounted to the stick boom 16 and to the hoist boom 30, such that the hydraulic cylinder 34 may be actuated in order to pivot the stick boom 16 with respect to the hoist boom 30. Further, a hydraulic cylinder 36 is mounted to the hoist boom 30 and the frame 32, such that the hydraulic cylinder 36 may be actuated in order to pivot the hoist boom 30 with respect to the frame 32.

In the embodiment depicted, the various booms 16 and 30, the wrist assembly 20, and the various hydraulic cylinders 22, 34, and 36 are configured to move the knuckle boom assembly 14 within a single boom assembly plane (e.g., a plane oriented along the page), in a fore-aft direction D. In other configurations, other movements of a boom assembly may be possible. Further, in some embodiments, a different number or configuration of hydraulic cylinders or other actuators may be used. For example, two hoist cylinders 36 may be provided, rotational (or other) actuators may be used, and so on. Generally, the double cut control system disclosed herein may be applied with respect to any type of actuator capable of producing relative movement of one or more booms (or other features) of a boom assembly and an end effector relative to a vehicle frame or another component of the boom assembly.

Generally, it will be understood that the configuration of the knuckle boom assembly 14 is presented as an example only. In this regard, a hoist boom (e.g., the hoist boom 30) may be generally viewed as a boom that is pivotally attached to a vehicle frame, and a stick boom (e.g., the stick boom 16) may be viewed as a boom that is pivotally attached to a hoist boom at an attachment point that is removed from the vehicle frame, and that is also pivotally attached to an end effector. Similarly, a stick pin (e.g., the stick pin 18) may be generally viewed as a pin or similar feature effecting pivotal attachment of a stick boom to an end effector (e.g., via a wrist assembly). In this light, a tilt actuator (e.g., the hydraulic cylinder 22) may be generally viewed as an actuator for pivoting an end effector with respect to a stick boom, a stick actuator (e.g., the hydraulic cylinder 34) may be generally viewed as an actuator for pivoting a stick boom with respect to a hoist boom, and a hoist actuator (e.g., the hydraulic cylinder 36) may be generally viewed as an actuator for pivoting a hoist boom with respect to a vehicle frame.

The feller buncher 10 may include one or more pumps 38, which may be driven by an engine of the feller buncher 10 (not shown). Flow from the pumps 38 may be routed through various control valves 40 and various conduits (e.g., flexible hoses) in order to move one or more of the hydraulic cylinders 22, 34, and 36. Flow from the pumps 38 may also power rotation of the saw disc 26, or various other components of the feller buncher 10. The flow from the pumps 38 may be controlled in various ways (e.g., through control of the various control valves 40), in order to cause movement of the hydraulic cylinders 22, 34, and 36, and thus, the felling head 12 relative to the frame 32. In this way, for example, a movement of the felling head 12 in the fore-aft direction D may be implemented by various control signals to the pumps 38, control valves 40, and so on.

Generally, a controller 42 (or multiple controllers) may be provided, for control of various aspects of the operation of the feller buncher 10, in general. The controller 42 (or others) may be configured as a computing device with associated processor devices and memory architectures, as a hard-wired computing circuit (or circuits), as a programmable circuit, as a hydraulic, electrical or electro-hydraulic controller, or otherwise. As such, the controller 42 may be configured to execute various computational and control functionality with respect to the feller buncher 10 (or other machinery). In some embodiments, the controller 42 may be configured to receive input signals in various formats (e.g., as hydraulic signals, voltage signals, current signals, and so on), and to output command signals in various formats (e.g., as hydraulic signals, voltage signals, current signals, mechanical movements, and so on). In some embodiments, the controller 42 (or a portion thereof) may be configured as an assembly of hydraulic components (e.g., valves, flow lines, pistons and cylinders, and so on), such that control of various devices (e.g., pumps or motors) may be effected with, and based upon, hydraulic, mechanical, or other signals and movements.

The controller 42 may be in electronic, hydraulic, mechanical, or other communication with various other systems or devices of the feller buncher 10 (or other machinery). For example, the controller 42 may be in electronic or hydraulic communication with various actuators, sensors, and other devices within (or outside of) the feller buncher 10, including various devices associated with the pumps 38, control valves 40, and so on. The controller 42 may communicate with other systems or devices (including other controllers) in various known ways, including via a CAN bus (not shown) of the feller buncher 10, via wireless or hydraulic communication means, or otherwise. An example location for the controller 42 is depicted in FIG. 1. It will be understood, however, that other locations are possible including other locations on the feller buncher 10, or various remote locations.

In some embodiments, the controller 42 may be configured to receive input commands via an operator input device or input interface 44, which may be disposed inside a cab 46 of the feller buncher 10 for easy access by an operator. The input interface 44 may be configured in a variety of ways. In some embodiments, the input interface 44 may include one or more joysticks, various switches or levers, one or more buttons, a touchscreen interface that may be overlaid on a display, a keyboard, a microphone associated with a speech recognition system, or various other input devices.

Various sensors may also be provided to observe various conditions associated with the feller buncher 10. In some embodiments, various sensors 48 (e.g., pressure, flow or other sensors) may be disposed near the pumps 38 and control valves 40, or elsewhere on the feller buncher 10. In some embodiments, various sensors may be disposed near the felling head 12. For example, sensors 50 (e.g. load sensors) may be disposed on or coupled near the felling head 12 in order to measure parameters including the rotational speed of the saw disc 26, a speed of a hydraulic motor 52 rotating the saw disc 26, a hydraulic pressure for driving the saw disc 26 (e.g., via the hydraulic motor 52) and so on. Various sensors 54 may also be disposed on or near the felling head 12 in order to measure parameters such as a proximity of objects to the saw disc 26 and/or the felling head 12, and so on. In some embodiments, the sensors 54 may include a capacitance sensor, a laser sensor, a camera coupled to or near the felling head 12, etc.

In some embodiments, various sensors 56, 58 and 60 (e.g., linear position sensors 56, 58 and 60) may be configured to determine the length of the hydraulic cylinders 22, 34, and 36, respectively, or detect various other indicators of the current orientation or position of the stick boom 16, hoist boom 30, and felling head 12. The current orientation or position of the stick boom 16 and hoist boom 30 may include the current orientation or position for the knuckle boom assembly 14. Other sensors may also (or alternatively) be used. For example, angular position or displacement sensors may be utilized in place of the linear position sensors 56, 58 and 60, in order to detect the angular orientation of the felling head 12, stick boom 16, and hoist boom 30, relative to each other or relative to the frame 32. In such a case, the detected angular orientations may provide alternative (or additional) indicators of the current position of the stick boom 16, the hoist boom 30, and the felling head 12.

Various sensors 62 may also be coupled or adjacent to the felling head 12 to observe a dimension of an object adjacent to the felling head 12. For example, sensors 62 may observe a diameter of a tree adjacent to the felling head 12 and generate sensor signals based thereon. In one example, the sensors 62 may include a laser distance sensor, an optical sensor, etc. Moreover, the sensors 62 may include a measurement sensor associated with the clasping arms 28, in which the dimension of the object, such as a diameter of a tree, may be determined based on a movement of the clasping arms 28 relative to the object. For example, a width W between the clasping arms 28 may be directly proportional to a diameter of a tree. It will be understood that while the sensors 62 are described herein as measuring a diameter of a tree adjacent to the felling head 12, the sensors 62 may also measure a circumference of the tree, from which the diameter may be calculated by the controller 42.

The various components noted above (or others) may be utilized to control movement of the felling head 12 via control of the movement of the various hydraulic cylinders 22, 34, and 36. Accordingly, these components may be viewed as forming part of the double cut control system for movement of the felling head 12 and the knuckle boom assembly 14. Each of the sensors 48, 50, 54, 56, 58, 60 and 62 may be in communication with the controller 42 via a suitable communication architecture.

In various embodiments, the controller 42 outputs one or more control signals to the hydraulic cylinders 22, 34, and 36 associated with the knuckle boom assembly 14 based on one or more of the sensor signals received from the sensors 48, 50, 54, 56, 58, 60 and 62, and input received from the input interface 44, and further based on the double cut control systems and methods of the present disclosure. The controller 42 outputs the one or more control signals to the pumps 38 and/or control valves 40 associated with hydraulic cylinders 22, 34, and 36 to position the knuckle boom assembly 14 to advance the felling head 12 in the fore-aft direction D a single time a first set distance corresponding to the first, partial depth cut of the tree based on one or more of the sensor signals received from the sensors 48, 50, 54, 56, 58, 60 and 62, and input received from the input interface 44. By advancing the felling head 12 the first set distance, the first, partial depth cut may be made that facilitates a successful second cut during a double cut operation. The controller 42 also outputs one or more control signals to the pumps 38 and/or control valves 40 associated with the hydraulic cylinders 22, 34, and 36 to position the knuckle boom assembly 14 to advance the felling head 12 in the fore-aft direction D a single time a second set distance corresponding to a second cut to sever the tree based on one or more of the sensor signals received from the sensors 48, 50, 54, 56, 58, 60 and 62, and input received from the input interface 44.

Figure 2:
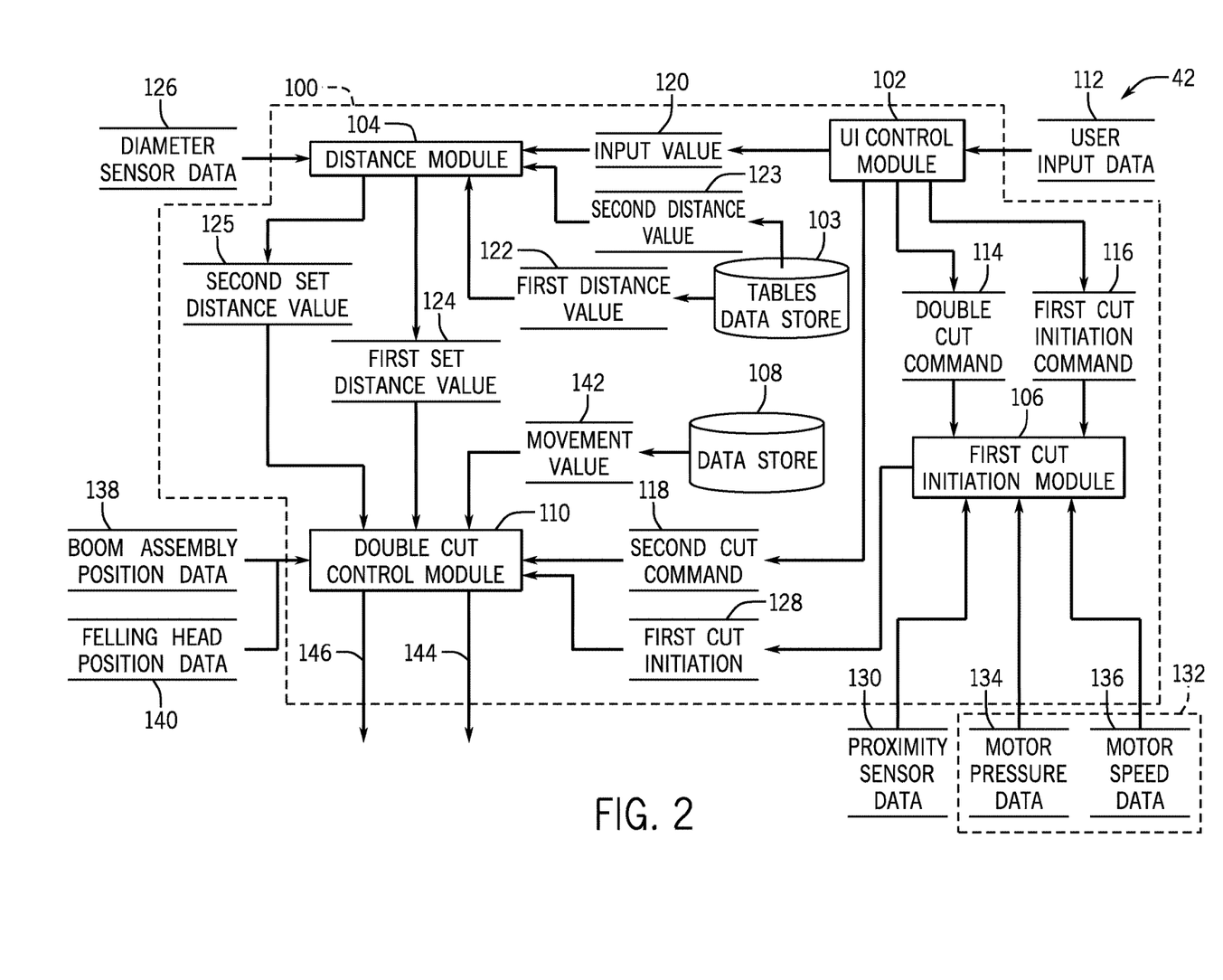
FIG. 2 is a dataflow diagram illustrating an example double cut control system in accordance with various embodiments.

Referring also to FIG. 2, a dataflow diagram illustrates various embodiments of a double cut control system 100 for the feller buncher 10, which may be embedded within the controller 42. Various embodiments of the double cut control system 100 according to the present disclosure can include any number of sub-modules embedded within the controller 42. As can be appreciated, the sub-modules shown in FIG. 2 can be combined and/or further partitioned to similarly control the hydraulic cylinders 22, 34, and 36 for the first, partial depth cut and the second cut. Inputs to the double cut control system 100 may be received from the sensors 48, 50, 54, 56, 58, 60 and 62 (FIG. 1), received from the input interface 44 (FIG. 1), received from other control modules (not shown) associated with the feller buncher 10, and/or determined/modeled by other sub-modules (not shown) within the controller 42. In various embodiments, the controller 42 includes a user interface (UI) control module 102, a tables data store 103, a distance module 104, a first cut initiation module 106, a data store 108 and a double cut control module 110.

The UI control module 102 receives as input user input data 112 from the input interface 44. The user input data 112 may include a command to initiate a double cut operation, and may also comprise a command to initiate the first, partial depth cut. In certain embodiments, the user input data 112 may also comprise an input value for a dimension of an object adjacent to the felling head 12, such as a diameter of a tree adjacent to the felling head 12. The user input data 112 may also comprise a command to initiate the second cut.

The UI control module 102 interprets the user input data 112, and sets a double cut control input command 114 for the first cut initiation module 106. The double cut control input command 114 may include a command for a double cut operation received from the input interface 44. The UI control module 102 also interprets the user input data 112 and sets a first cut initiation command 116 for the first cut initiation module 106. The first cut initiation command 116 may include a command that for an initiation of the first, partial depth after the double cut control input command 114 has been received. The UI control module 102 interprets the user input data 112 and sets a second cut command 118 for the double cut control module 110. The second cut command 118 may include a command for the second cut as requested via the input interface 44. The UI control module 102 also interprets the user input data 112 and sets an input value 120 for the distance module 104. The input value 120 may include a dimension, such as a diameter, of the tree adjacent to the felling head 12, which is received via the input interface 44.

The tables data store 103 stores one or more tables (e.g., lookup tables) that indicate a distance to move the felling head 12 based on a dimension of the adjacent object or subject, such as a diameter of a tree. In other words, the tables data store 103 stores one or more tables that provide a first distance for the movement of the felling head 12 that corresponds to a partial depth cut based on various diameters of trees, and stores one or more tables that provide a second distance for the movement of the felling head 12 to sever the tree based on the various first distances and the various tree diameters. The one or more tables may include calibration tables, which are acquired based on experimental data. In various embodiments, the tables may be interpolation tables that are defined by one or more indexes.

A first distance value 122 provided by at least one of the tables indicates a first distance for the movement of the felling head 12 that corresponds to a partial depth cut based on the diameter of the tree. In certain embodiments, the first distance value 122 may be based on a predetermined proportion of the diameter of the tree. For example, the first distance value 122 may include a distance to cut through about 25% of the determined diameter of the tree. As an example, one or more tables can be indexed by various parameters such as, but not limited to, tree diameter, to provide the first distance value 122.

A second distance value 123 provided by at least one of the tables indicates a second distance for the movement of the felling head 12 that corresponds to a remainder of the depth of the tree to cut to sever the tree based on the diameter of the tree and the first diameter. Stated another way, the second distance value 123 may include a remaining distance to be cut by the felling head 12 to complete the cutting of the tree. In certain embodiments, the second distance value 123 may be based on a predetermined proportion of the diameter of the tree remaining after the first distance value 122. For example, the second distance value 123 may include a distance to cut through about 75% of the determined diameter of the tree based on the first distance value 122 being the distance to cut through about 25% of the determined diameter of the tree. As an example, one or more tables can be indexed by various parameters such as, but not limited to, tree diameter and the first distance value, to provide the second distance value 123.

The distance module 104 receives as input the input value 120. Based on the input value 120, the distance module 104 retrieves the first distance value 122 and the second distance value 123 from the tables data store 103 that corresponds to the diameter of the tree from the input value 120. The distance module 104 sets the first distance value 122 as a first set distance value 124 for the double cut control module 110, and sets the second distance value 123 as a second set distance value 125 for the double cut control module 110. The first set distance value 124 may include the distance to advance the felling head 12, which corresponds to the first, partial depth cut. The second set distance value 125 may include the distance to advance the felling head 12, which corresponds to the second cut of the tree to sever the tree.

The distance module 104 also receives as input diameter sensor data 126. The diameter sensor data 126 may include sensor data or sensor signals from the sensors 62, which indicate a dimension, such as a diameter of the tree. The distance module 104 interprets the diameter sensor data 126, and determines a diameter of a tree adjacent to the felling head 12. The distance module 104 retrieves the first distance value 122 and the second distance value 123 from the tables data store 103 based on the determined diameter, and sets the retrieved first distance value 122 as the first set distance value 124 and sets the retrieved second distance value 123 as the second set distance value 125 for the double cut control module 110. In certain embodiments, the distance module 104 may set the first set distance value 124 and the second set distance value 125 based on a default or factory defined distance value. For example, the default distance value may be about 6.0 feet to about 8.0 feet. Thus, the use of the tables data store 103 to obtain the first set distance value 124 and the second set distance value 125 is merely an example.

The first cut initiation module 106 receives as input the double cut control input command 114 and a first cut initiation command 116. Based on the double cut control input command 114 and the first cut initiation command 116, the first cut initiation module 106 determines to enable a first cut, and sets a first cut initiation 128 for the double cut control module 110.

The first cut initiation module 106 also receives as input proximity sensor data 130 from the sensors 54. The proximity sensor data 130 may include the sensor signals or sensor data from the sensors 54, which indicate a proximity of objects, such as a tree, to the saw disc 26 and/or the felling head 12. The first cut initiation module 106 interprets the proximity sensor data 130 and determines a proximity of the object to the saw disc 26 and/or the felling head 12. The first cut initiation module 106 determines whether the proximity of the object is within a predefined threshold, such as about twelve inches. Based on the double cut control input command 114 and the proximity of the object as within the predefined threshold, the first cut initiation module 106 determines to enable a first cut, and sets the first cut initiation 128 for the double cut control module 110.

The first cut initiation module 106 also receives as input load data 132. In various embodiments, the load data 132 may include load values associated with the hydraulic motor 52 driving the saw disc 26, and in one example, the load data 132 includes motor pressure data 134 and motor speed data 136. The motor pressure data 134 may include the sensor signals or sensor data from the sensors 50, which indicates a sensed pressure in a hydraulic circuit of the hydraulic motor 52 rotating the saw disc 26. The first cut initiation module 106 interprets the motor pressure data 134 and determines whether there has been a change in a pressure of the hydraulic circuit associated with the hydraulic motor 52. For example, the first cut initiation module 106 determines if the pressure of the hydraulic circuit has increased or risen by a prescribed amount, such as an increase of about 10 to about 15 pounds per square inch, which indicates that the saw disc 26 has contacted an object, such as a tree. Based on the motor pressure data 134 and the double cut control input command 114, the first cut initiation module 106 determines to enable a first cut, and sets the first cut initiation 128 for the double cut control module 110.

The motor speed data 136 may include the sensor signals or sensor data from the sensors 50, which indicate a sensed speed of the hydraulic motor 52. The first cut initiation module 106 interprets the motor speed data 136 and determines whether there has been a change in a speed of the hydraulic motor 52. For example, the first cut initiation module 106 determines if the speed of the hydraulic motor 52 has decreased or has been reduced by a prescribed amount, which indicates that the saw disc 26 has contacted an object, such as a tree. Based on the motor speed data 136 and the double cut control input command 114, the first cut initiation module 106 determines to enable a first cut, and sets the first cut initiation 128 for the double cut control module 110.

The data store 108 stores one or more tables (e.g., lookup tables) that indicate a movement of the various hydraulic cylinders 22, 34, and 36 based on boom assembly position data 138 from the sensors 58 and 60, felling head position data 140 from the sensors 56, the first set distance value 124 and the second set distance value 125. In other words, the data store 108 stores one or more tables that provide an amount of hydraulic fluid to be applied to the hydraulic cylinders 22, 34, and 36 from the pumps 38 and/or the control valves 40 based on various positions of the knuckle boom assembly 14, various positions of the felling head 12, the first set distance for the movement of the felling head 12 for the first, partial depth cut and the second set distance for the movement of the felling head 12 for the second cut to sever the tree. The one or more tables comprise calibration tables, which are acquired based on experimental data. In various embodiments, the tables may be interpolation tables that are defined by one or more indexes. A movement value 142 provided by at least one of the tables indicates an amount of hydraulic fluid to be applied to the hydraulic cylinders 22, 34, and 36 by the pumps 38 and/or the control valves 40 to position the knuckle boom assembly 14 and to advance the felling head in the fore-aft direction D (FIG. 1) the distance corresponding to the first, partial depth cut or the distance corresponding to the second cut based on the position of the knuckle boom assembly 14, felling head 12, the first set distance value 124 and the second set distance value 125. As an example, one or more tables can be indexed by various parameters such as, but not limited to, boom assembly position, felling head position, first set distance value and second set distance value, to provide the movement value 142.

The double cut control module 110 receives as input the first cut initiation 128 and the first set distance value 124. The double cut control module 110 also receives as input the boom assembly position data 138 and the felling head position data 140. The boom assembly position data 138 may include the sensor signals or sensor data from the sensors 58, 60, which indicate orientation or position values for the stick boom 16 and the hoist boom 30, which comprise orientation or position values for the knuckle boom assembly 14. The felling head position data 140 may include the sensor signals or sensor data from the sensors 56, which indicate orientation or position values for the felling head 12. Based on the first cut initiation 128, the double cut control module 110 interprets the boom assembly position data 138 and determines the position of the knuckle boom assembly 14. Based on the first cut initiation 128, the double cut control module 110 interprets the felling head position data 140 and determines the position of the felling head 12. Based on the determined position of the knuckle boom assembly 14, the determined position of the felling head 12 and the first set distance value 124, the double cut control module 110 queries the data store 108 and retrieves the movement value 142. Based on the movement value 142 and the first cut initiation 128, the double cut control module 110 outputs a first cut control signal 144 to the pumps 38 and/or control valves 40 to direct a flow of hydraulic fluid to the hydraulic cylinders 22, 34, and 36 to position the knuckle boom assembly 14 to advance the felling head 12 in a single fore-aft direction the first set distance corresponding to the partial cut depth.

The double cut control module 110 also receives as input the second cut command 118 and the second set distance value 125. Based on the second cut command 118, the double cut control module 110 interprets the boom assembly position data 138 and the felling head position data 140 to determine the position of the knuckle boom assembly 14 and the position of the felling head 12, respectively. Based on the determined position of the knuckle boom assembly 14, the determined position of the felling head 12 and the second set distance value 125, the double cut control module 110 queries the data store 108 and retrieves the movement value 142. Based on the movement value 142 and the second cut command 118, the double cut control module 110 outputs a second cut control signal 146 to the pumps 38 and/or control valves 40 to direct a flow of hydraulic fluid to the hydraulic cylinders 22, 34, and 36 to position the knuckle boom assembly 14 to advance the felling head 12 in a single fore-aft direction the second set distance to complete the second cut and sever the tree.

Figure 3:
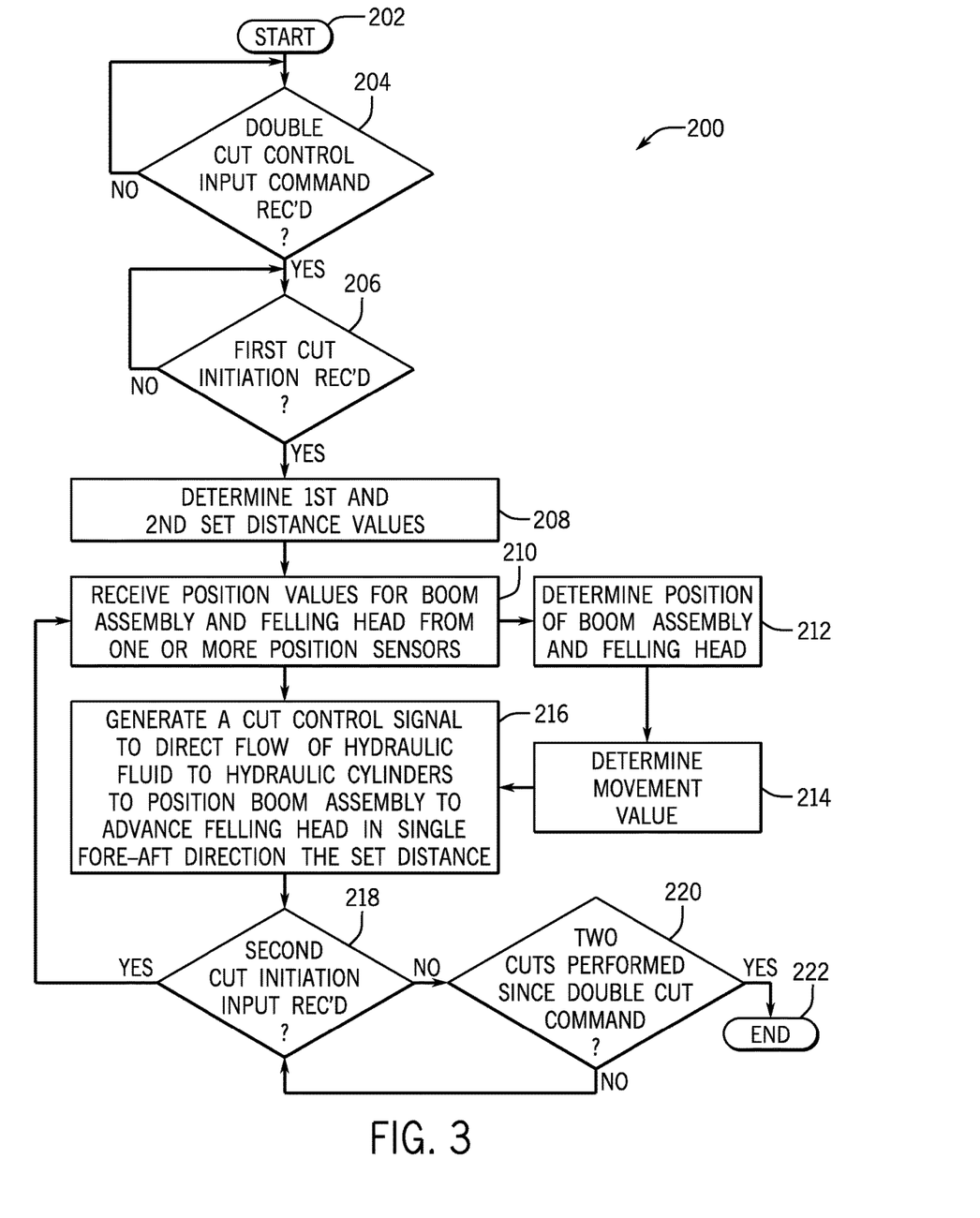
FIG. 3 is a flowchart illustrating an example control method of the disclosed double cut control system of FIG. 1 in accordance with various embodiments.

Referring now also to FIG. 3, a flowchart illustrates a control method 200 that may be performed by the controller 42 of FIGS. 1-2 in accordance with the present disclosure. As can be appreciated in light of the disclosure, the order of operation within the method is not limited to the sequential execution as illustrated in FIG. 3, but may be performed in one or more varying orders as applicable and in accordance with the present disclosure. In various embodiments, the method may be scheduled to run based on predetermined events, and/or can run based on the receipt of user input data 112.

In one example, with reference to FIG. 3, the method begins at 202. At 204, the method determines whether a double cut control input command 114 to enable a double cut operation has been received, based on the user input data 112. Based on the receipt of the user input data 112 indicating a request to enable a double cut operation, the method proceeds to 206. Otherwise, the method continues to determine whether the double cut control input command 114 has been received.

At 206, the method determines whether the first cut initiation 128 has been received, such that a first cut of the double cut operation is enabled. In one example, with reference to FIG. 4, a flowchart illustrates a control method 300 for generating the first cut initiation 128 that may be performed by the controller 42 of FIGS. 1-2 in accordance with the present disclosure. The control method 300 begins at 302, and at 304, the method determines whether the first cut initiation command 116 is received via the input interface 44. If the first cut initiation command 116 is received, at 306, the method determines to enable the first cut and sets the first cut initiation 128. The method ends at 308.

Figure 4:
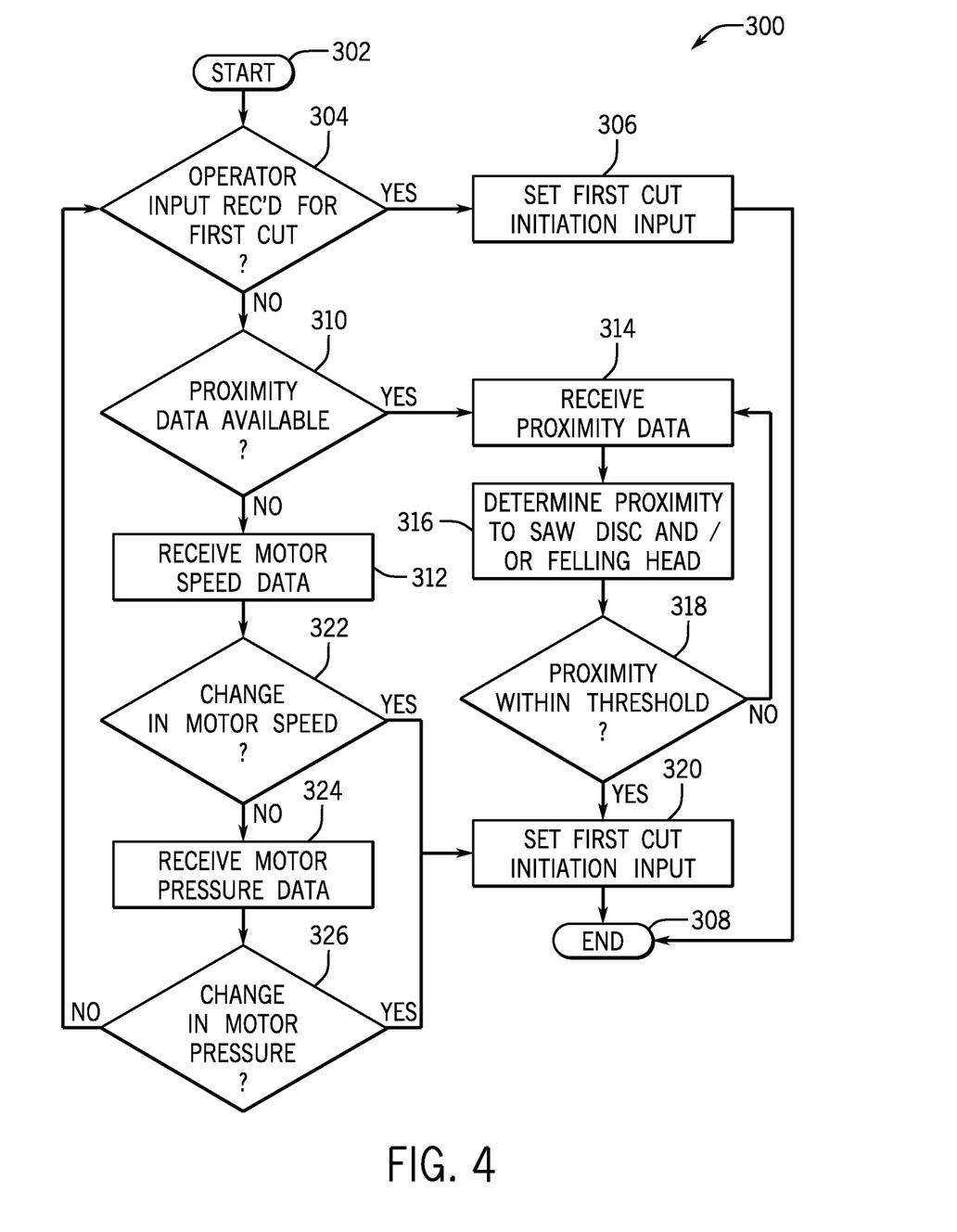
FIG. 4 is a flowchart illustrating an example control method for initiating a first, partial depth cut in accordance with various embodiments.

Otherwise, at 310, the method determines whether proximity sensor data 130 is available from the sensors 54, such that the feller buncher 10 is equipped with the sensors 54. If the proximity sensor data 130 is unavailable, the method proceeds to 312. If proximity sensor data 130 is available, at 314, the method receives the proximity sensor data 130 from the sensors 54. At 316, the method interprets the proximity sensor data 130 and determines a proximity of the object, such as the tree, to the saw disc 26 and/or felling head 12. At 318, the method determines whether the proximity of the object is within the predefined threshold, such as within twelve inches. If true, at 320, the method determines to enable the first cut and sets the first cut initiation 128. The method ends at 308. Otherwise, the method loops to 314.

At 312, the method receives the motor speed data 136 from the sensors 50. Based on the motor speed data 136, the method determines whether there has been a change in the motor speed at 322. If there has been a change in the motor speed based on the motor speed data 136, for example, a decrease in a speed of the hydraulic motor 52, the method proceeds to 320. Otherwise, at 324, the method receives the motor pressure data 134 from the sensors 50. At 326, the method determines whether there has been a change in the hydraulic pressure associated with the hydraulic motor 52 based on the motor pressure data 134, for example, an increase in hydraulic pressure. If there has been a change in the motor pressure data 134, the method proceeds to 320. Otherwise, the method loops to 304.

With reference back to FIG. 3, if it is determined that the first cut initiation 128 has been received at 206, the method proceeds to 208. Otherwise, the method loops. At 208, the method determines the first set distance value 124 and the second set distance value 125. In one example, with reference to FIG. 5, a flowchart illustrates a control method 400 for determining the first set distance value 124 and the second set distance value 125 that may be performed by the controller 42 of FIGS. 1-2 in accordance with the present disclosure.

Figure 5:
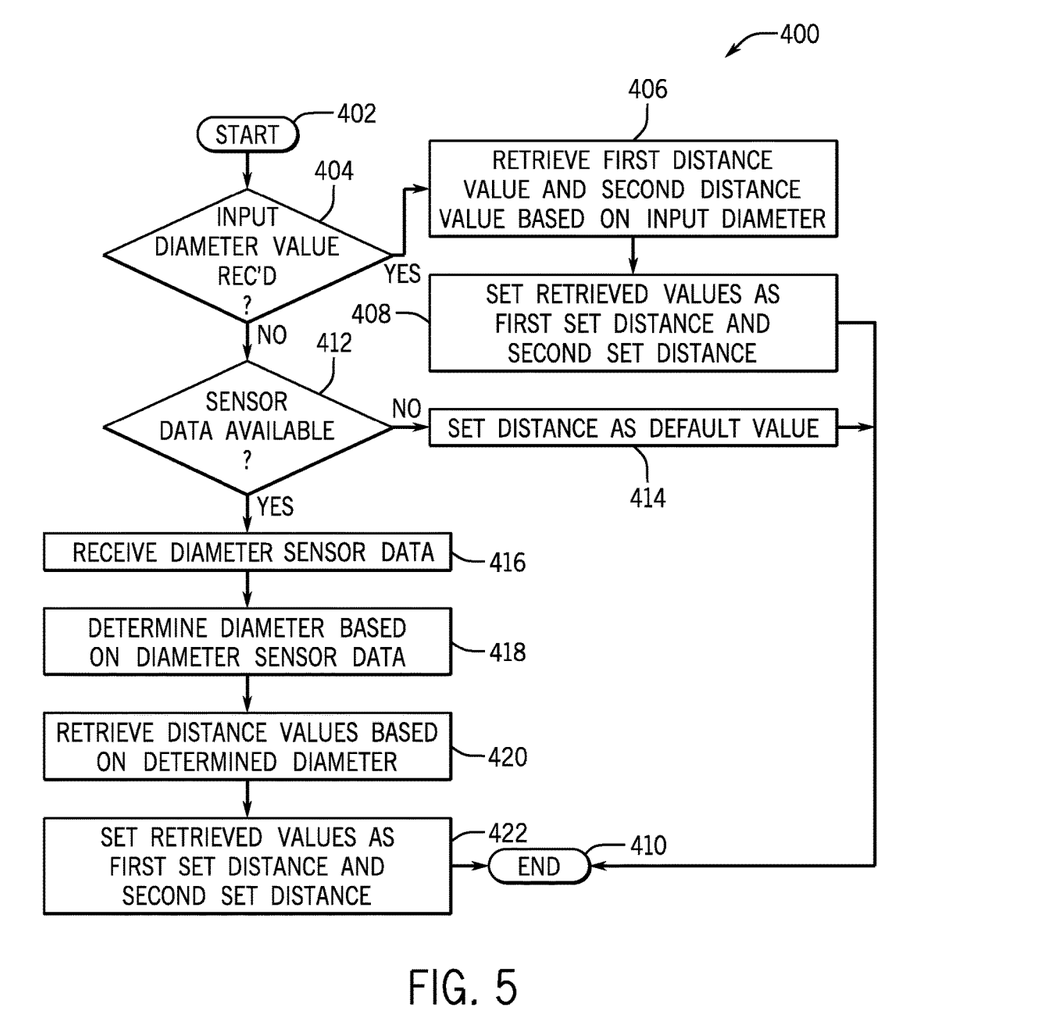
FIG. 5 is a flowchart illustrating an example control method for determining a set distance for in accordance with various embodiments.

With reference to FIG. 5, the method begins at 402, and at 404, the method determines whether the input value 120 has been received via the input interface 44. If the input value 120 has been received, at 406, the method retrieves the first distance value 122 and the second distance value 123 from the tables data store 103 based on the input value 120. At 408, the method sets the retrieved first distance value 122 and the retrieved second distance value 123 as the first set distance value 124 and the second set distance value 125, respectively. The method ends at 410.

Otherwise, at 412, the method determines whether diameter sensor data 126 from the sensors 62 is available, such that the feller buncher 10 is equipped with sensors 62. If unavailable, at 414, the method sets the first set distance value 124 and the second set distance value 125 to default or factory set values. The method ends at 410.

If the diameter sensor data 126 is available from the sensors 62, the method retrieves the diameter sensor data 126 at 416. At 418, the method interprets the diameter sensor data 126 and determines a diameter of the tree based on the diameter sensor data 126. At 420, the method retrieves the first distance value 122 and the second distance value 123 from the tables data store 103 based on the determined diameter. At 422, the method sets the retrieved first distance value 122 as the first set distance value 124, and sets the retrieved second distance value 123 as the second set distance value 125. The method ends at 410.

With reference back to FIG. 3, at 210, the method receives the boom assembly position data 138 from the sensors 58 and 60, and the felling head position data 140 from the sensor 56. At 212, the method determines the position of the knuckle boom assembly 14 and the position of the felling head 12 based on the boom assembly position data 138 and the felling head position data 140, respectively. At 214, the method determines or retrieves the movement value 142 from the data store 108 based on the position of the knuckle boom assembly 14, the position of the felling head 12 and the first set distance value 124 or the second set distance value 125. At 216, the method generates or outputs the first cut control signal 144 to direct a flow of hydraulic fluid to the hydraulic cylinders 22, 34, and 36 to position the knuckle boom assembly 14 to advance the felling head 12 in a single fore-aft direction the first set distance value 124 or the method generates or outputs the second cut control signal 146 to direct a flow of hydraulic fluid to the hydraulic cylinders 22, 34, and 36 to position the knuckle boom assembly 14 to advance the felling head 12 in a single fore-aft direction the second set distance value 125 to complete the second cut of the tree.

At 218, the method determines whether the second cut command 118 has been received via the input interface 44. If the second cut command 118 has been received, the method loops to 208. Otherwise, the method determines, at 220, whether two cuts have been performed since the receipt of the double cut control input command 114. If two cuts have been performed (such that the tree has been cut completely), the method ends at 222. Otherwise, the method loops to 218.

Figure 6A:
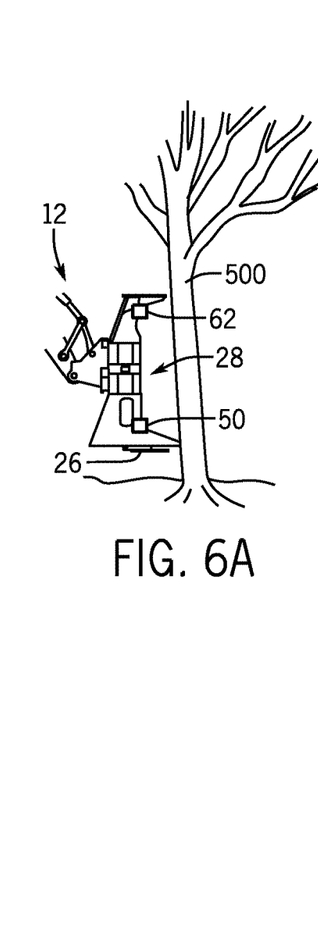
FIGS. 6A-6E are simplified partial side views illustrating the double cut control system and method being implemented to fell a standing tree.
Figure 6B:
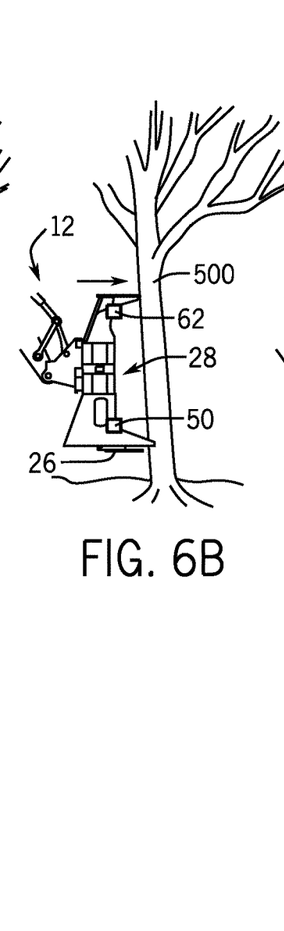

With continued reference to FIGS. 1-2, and with additional reference to FIGS. 6A-6E, the double cut control system and method is illustrated as implemented to move the felling head 12 to fell a standing tree 500. For clarity, only the felling head 12 is illustrated in FIGS. 6-10, with the understanding that the entirety of the feller buncher 10 is employed to fell the tree 500. With reference to FIG. 6A, the felling head 12 is illustrated as positioned adjacent to the tree 500. Upon receipt of a double cut control input command 114, the controller 42 determines whether to enable the first cut, based on receipt of the first cut initiation 128. As discussed, the first cut initiation 128 may be received via the input interface 44, the load data 132 and/or the proximity sensor data 130.

Figure 6C:
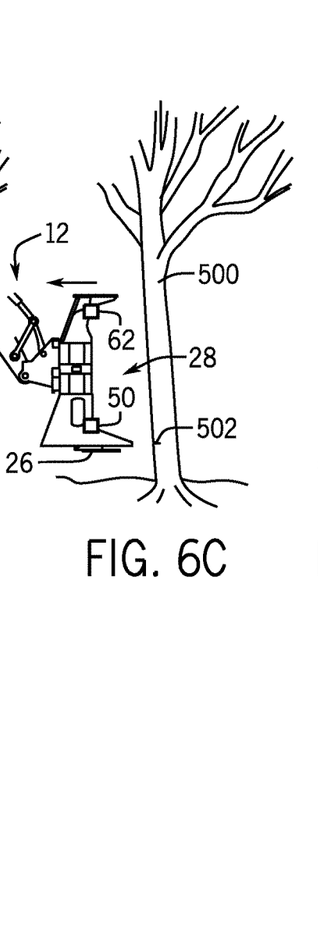

Once the controller 42 determines to enable the first cut via the first cut initiation 128, the controller 42 determines the first set distance value 124, the second set distance value 125, the position of the knuckle boom assembly 14 and the position of the felling head 12. Based on the determined position of the knuckle boom assembly 14, the felling head 12 and the first set distance value 124, the controller 42 determines or retrieves the movement value 142. Based on the retrieved movement value 142, with reference to FIG. 6B, the controller 42 generates the first cut control signal 144, which moves the felling head 12 such that the saw disc 26 cuts the tree 500 for the first, partial depth cut. An exemplary partial depth cut 502 is illustrated in FIG. 6C.

Figure 6D:
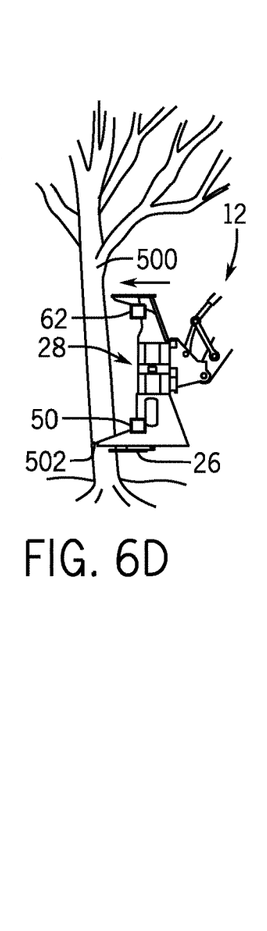
Figure 6E:
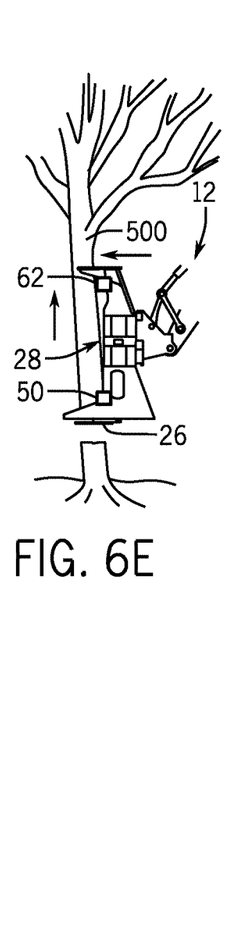

With reference to FIG. 6D, once the partial depth cut 502 is completed, the feller buncher 10 is position on a substantially opposite side of the tree 500. The controller 42 determines whether the second cut command 118 has been received via input interface 44. Upon receipt of the second cut command 118, the controller 42 determines the position of the knuckle boom assembly 14 and the position of the felling head 12 based on the sensor signals or sensor data from the sensors 56, 58 and 60. Based on the determined position of the knuckle boom assembly 14, the felling head 12 and the second set distance value 125, the controller 42 determines or retrieves the movement value 142. Based on the retrieved movement value 142, the controller 42 generates the second cut control signal 146, which moves the felling head 12 such that the saw disc 26 cuts the tree 500 for the second cut, in which the tree 500 is severed. A completed second cut is illustrated in FIG. 6E. Thus, the double cut control system and method of the present disclosure allows the second cut to sever the tree 500 without causing the tree 500 to topple.

As will be appreciated by one skilled in the art, certain aspects of the disclosed subject matter can be embodied as a method, system (e.g., a work vehicle control system included in a work vehicle), or computer program product. Accordingly, certain embodiments can be implemented entirely as hardware, entirely as software (including firmware, resident software, micro-code, etc.) or as a combination of software and hardware (and other) aspects. Furthermore, certain embodiments can take the form of a computer program product on a computer-usable storage medium having computer-usable program code embodied in the medium.

Any suitable computer usable or computer readable medium can be utilized. The computer usable medium can be a computer readable signal medium or a computer readable storage medium. A computer-usable, or computer-readable, storage medium (including a storage device associated with a computing device or client electronic device) can be, for example, but is not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium can be any tangible medium that can contain, or store a program for use by or in connection with the instruction execution system, apparatus, or device.

A computer readable signal medium can include a propagated data signal with computer readable program code embodied therein, for example, in baseband or as part of a carrier wave. Such a propagated signal can take any of a variety of forms, including, but not limited to, electro-magnetic, optical, or any suitable combination thereof. A computer readable signal medium can be non-transitory and can be any computer readable medium that is not a computer readable storage medium and that can communicate, propagate, or transport a program for use by or in connection with an instruction execution system, apparatus, or device.

Aspects of certain embodiments are described herein can be described with reference to flowchart illustrations and/or block diagrams of methods, apparatus (systems) and computer program products according to embodiments of the invention. It will be understood that each block of any such flowchart illustrations and/or block diagrams, and combinations of blocks in such flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions can also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Any flowchart and block diagrams in the figures, or similar discussion above, can illustrate the architecture, functionality, and operation of possible implementations of systems, methods and computer program products according to various embodiments of the present disclosure. In this regard, each block in the flowchart or block diagrams can represent a module, segment, or portion of code, which may include one or more executable instructions for implementing the specified logical function(s). It should also be noted that, in some alternative implementations, the functions noted in the block (or otherwise described herein) can occur out of the order noted in the figures. For example, two blocks shown in succession (or two operations described in succession) can, in fact, be executed substantially concurrently, or the blocks (or operations) can sometimes be executed in the reverse order, depending upon the functionality involved. It will also be noted that each block of any block diagram and/or flowchart illustration, and combinations of blocks in any block diagrams and/or flowchart illustrations, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A double cut control system for a felling head having a saw disc and positioned by a knuckle boom having a hoist boom and a stick boom coupled by a knuckle, the knuckle boom being positioned by hydraulic cylinders actuated by a hydraulic pump and hydraulic control valves, the control system comprising:
an operator input device for input of operator commands including a double cut control input command;
position sensors providing position values for the knuckle boom and the felling head; and
at least one controller receiving the operator commands and position values;
wherein, after receiving the double cut control input command and position values, the at least one controller generates a first cut control signal to direct flow of hydraulic fluid to the hydraulic cylinders to position the knuckle boom to advance the felling head in a single fore-aft direction a set distance corresponding to a partial depth cut of a tree.

2. The double cut control system of claim 1, wherein the set distance is a pre-determined distance value.

3. The double cut control system of claim 1, wherein the set distance is a variable operator input value.

4. The double cut control system of claim 1, wherein the set distance is a variable value based on a dimension of the tree to be cut.

5. The double cut control system of claim 4, wherein the dimension is an approximate diameter of the tree; and
wherein the at least one controller computes the set distance based on a predetermined proportion of the diameter of the tree.

6. The double cut control system of claim 1, wherein the at least one controller generates the first cut control signal upon receiving the double cut control input command from an operator.

7. The double cut control system of claim 1, wherein the at least one controller generates the first cut control signal upon receiving a first cut initiation input after receiving the double cut control input command from an operator.

8. The double cut control system of claim 7, wherein the first cut initiation input is an operator input command.

9. The double cut control system of claim 7, wherein the first cut initiation input is a sensed input.

10. The double cut control system of claim 9, wherein the sensed input is a proximity input based on a sensed proximity of the saw disc to the tree; and
wherein the proximity input is determined from at least one of a capacitance sensor, a laser sensor and a camera mounted to the felling head.

11. The double cut control system of claim 9, wherein the sensed input is a load sense input based on operation of the saw disc.

12. The double cut control system of claim 11, wherein the load sense input is a motor speed value based on a sensed speed of a motor rotating the saw disc, the motor speed value corresponding to a prescribed reduction in motor speed.

13. The double cut control system of claim 11, wherein the load sense input is a motor pressure input based on a sensed pressure in a hydraulic circuit of a motor rotating the saw disc, the motor pressure input corresponding to a prescribed rise in motor pressure.

14. A double cut control system for a felling head having a saw disc and positioned by a knuckle boom having a main boom and a stick boom coupled by a knuckle, the knuckle boom being positioned by hydraulic cylinders actuated by a hydraulic pump and hydraulic control valves, the control system comprising:
an operator input device for input of operator commands including a double cut control input command;
position sensors providing position values for the knuckle boom and the felling head;
a load sensor providing load values of a motor driving the saw disc; and
at least one controller receiving the operator commands, the position values and the load values;
wherein, after receiving the double cut control input command and a load value corresponding to at least one of a prescribed motor speed reduction and a prescribed motor pressure rise, the at least one controller generates a first cut control signal to direct flow of hydraulic fluid to the hydraulic cylinders to position the knuckle boom to advance the felling head in a single fore-aft direction a set distance corresponding to a partial depth cut of a tree.

15. A double cut control method for a felling head having a saw disc and positioned by a knuckle boom having a hoist boom and a stick boom coupled by a knuckle, the knuckle boom being positioned by hydraulic cylinders actuated by a hydraulic pump and hydraulic control valves, the method comprising:
receiving, by one or more controllers, a double cut control input command from an operator input device;
receiving, by the one or more controllers, position values for the knuckle boom and the felling head from one or more position sensors; and
generating, by the one or more controllers, a first cut control signal to direct flow of hydraulic fluid to the hydraulic cylinders to position the knuckle boom to advance the felling head in a single fore-aft direction a set distance corresponding to a partial depth cut of a tree based on the received double cut control input command and position values.

16. The method of claim 15, wherein the one or more controller generate the first cut control signal upon receiving the double cut control input command from an operator.

17. The method of claim 15, wherein the one or more controllers generate the first cut control signal upon receiving a first cut initiation input after receiving the double cut control input command from an operator; and
wherein the first cut initiation input is one of an operator input command and a sensed input.

18. The method of claim 17, wherein the sensed input is a proximity input based on a sensed proximity of the saw disc to the tree; and
wherein the proximity input is determined from at least one of a capacitance sensor, a laser sensor and a camera mounted to the felling head.

19. The method of claim 17, wherein the sensed input is a load sense input based on operation of the saw disc including at least one of:
a motor speed value based on a sensed speed of a motor rotating the saw disc and corresponding to a prescribed reduction in motor speed; and
a motor pressure input based on a sensed pressure in a hydraulic circuit of a motor rotating the saw disc and corresponding to a prescribed rise in motor pressure.

20. The method claim 15, wherein the set distance is one of a pre-determined distance value, a variable operator input value, and a variable value based on an approximation of a diameter of the tree to be cut.

* * * * *

UNITED STATES PATENT AND TRADEMARK OFFICE
CERTIFICATE OF CORRECTION

PATENT NO. : 10,098,290 B2
APPLICATION NO. : 14/858514
DATED : October 16, 2018
INVENTOR(S) : Jonathan R. Hunt Page 1 of 1

It is certified that error appears in the above-identified patent and that said Letters Patent is hereby corrected as shown below:

In the Claims

Column 18, Claim 20, Line 54, after "method" insert -- of --.

Signed and Sealed this
Eleventh Day of December, 2018

Andrei Iancu
*Director of the United States Patent and Trademark Office*